US009071870B2

(12) United States Patent
Koivisto et al.

(10) Patent No.: US 9,071,870 B2
(45) Date of Patent: Jun. 30, 2015

(54) SYSTEM AND METHOD FOR VIEWING DIGITAL VISUAL CONTENT ON A DEVICE

(75) Inventors: Antti Koivisto, Cambridge, MA (US); Andrei Popescu, Helsinki (FI); Virpi Roto, Espoo (FI); Guido Grassel, Espoo (FI); Mikko K. Makela, Tampere (FI); Roland Geisler, Cambridge, MA (US)

(73) Assignee: Nokia Technologies Oy, Espoo (FI)

( * ) Notice: Subject to any disclaimer, the term of this patent is extended or adjusted under 35 U.S.C. 154(b) by 1703 days.

(21) Appl. No.: 11/007,028

(22) Filed: Dec. 8, 2004

(65) Prior Publication Data

US 2006/0123183 A1     Jun. 8, 2006

(51) Int. Cl.
| | |
|---|---|
| *G06F 3/0481* | (2013.01) |
| *H04N 21/443* | (2011.01) |
| *G06F 3/0485* | (2013.01) |
| *H04N 5/44* | (2011.01) |
| *H04N 5/445* | (2011.01) |
| *H04N 21/414* | (2011.01) |
| *H04N 21/431* | (2011.01) |
| *H04M 1/725* | (2006.01) |
| *H04N 21/462* | (2011.01) |

(52) U.S. Cl.
CPC ............ *H04N 21/443* (2013.01); *G06F 3/0485* (2013.01); *G06F 2203/04804* (2013.01); *H04M 1/72544* (2013.01); *H04M 1/72561* (2013.01); *H04N 5/4403* (2013.01); *H04N 5/44504* (2013.01); *H04N 21/41407* (2013.01); *H04N 21/4312* (2013.01); *H04N 21/4314* (2013.01); *H04N 21/4622* (2013.01); *H04N 2005/441* (2013.01)

(58) Field of Classification Search
CPC .................................................. G06F 3/0481
USPC ............ 715/768, 718, 736, 784; 348/E5.006, 348/E5.1
See application file for complete search history.

(56) References Cited

U.S. PATENT DOCUMENTS

| | | | | |
|---|---|---|---|---|
| 4,417,239 A | * | 11/1983 | Demke et al. ................. | 715/856 |
| 4,428,065 A | * | 1/1984 | Duvall et al. ................. | 707/745 |
| 4,546,349 A | * | 10/1985 | Prohofsky et al. ............ | 345/667 |
| 4,684,935 A | * | 8/1987 | Fujisaku et al. ............... | 345/1.3 |

(Continued)

FOREIGN PATENT DOCUMENTS

| | | |
|---|---|---|
| EP | 1 215 563 | 6/2002 |
| JP | S-6324419 A | 2/1988 |

(Continued)

OTHER PUBLICATIONS

Stuart Pook et al., Context and interaction in zoomable user interfaces, copyright 2000, ACM, pp. 227-231.*

(Continued)

*Primary Examiner* — Phenuel Salomon
(74) *Attorney, Agent, or Firm* — Alston & Bird LLP

(57) ABSTRACT

A system and method for viewing material displayed on an electronic device. When a user desires to view a document, only a portion of which is viewable on a display at a given moment, the portion is displayed on the display as a primary image. A secondary image is then generated, with the secondary image including the portion and additional material of the document not part of the primary image. The secondary image is superimposed over the primary image on the display when a user scrolls through the document such that both the secondary image and the primary image are visible to the user.

35 Claims, 5 Drawing Sheets

(56) References Cited

U.S. PATENT DOCUMENTS

| | | | |
|---|---|---|---|
| 4,723,210 A * | 2/1988 | Barker et al. | 715/210 |
| 4,785,296 A * | 11/1988 | Tabata et al. | 345/634 |
| 4,823,303 A * | 4/1989 | Terasawa | 715/201 |
| 4,943,866 A * | 7/1990 | Barker et al. | 386/286 |
| 5,577,188 A * | 11/1996 | Zhu | 715/745 |
| 5,590,245 A * | 12/1996 | Leamy et al. | 345/418 |
| 5,621,430 A * | 4/1997 | Bricklin | 715/856 |
| 5,678,041 A * | 10/1997 | Baker et al. | 1/1 |
| 5,727,159 A * | 3/1998 | Kikinis | 709/246 |
| 5,838,320 A * | 11/1998 | Matthews, III et al. | 715/786 |
| 5,945,982 A * | 8/1999 | Higashio et al. | 1/1 |
| 6,018,619 A * | 1/2000 | Allard et al. | 709/224 |
| 6,628,243 B1 * | 9/2003 | Lyons et al. | 345/1.1 |
| 6,771,291 B1 * | 8/2004 | DiStefano, III | 715/762 |
| 6,931,661 B2 * | 8/2005 | Smith | 725/133 |
| 6,940,532 B1 * | 9/2005 | Fukui et al. | 715/784 |
| 7,006,091 B2 * | 2/2006 | Masera et al. | 345/428 |
| 7,079,160 B2 * | 7/2006 | Colavin | 345/684 |
| 7,174,053 B2 * | 2/2007 | Onuki et al. | 382/305 |
| 7,369,102 B2 * | 5/2008 | Luke et al. | 345/9 |
| 2001/0034661 A1 * | 10/2001 | Ferreira | 705/26 |
| 2002/0077172 A1 * | 6/2002 | Uchiyama et al. | 463/20 |
| 2002/0171682 A1 * | 11/2002 | Frank et al. | 345/790 |
| 2003/0080976 A1 * | 5/2003 | Satoh et al. | 345/629 |
| 2003/0095135 A1 * | 5/2003 | Kaasila et al. | 345/613 |
| 2003/0102065 A1 | 6/2003 | Picher et al. | |
| 2003/0103065 A1 | 6/2003 | Masera et al. | |
| 2003/0146938 A1 * | 8/2003 | Geiger | 345/784 |
| 2004/0008183 A1 * | 1/2004 | Morishita | 345/156 |
| 2004/0103371 A1 * | 5/2004 | Chen et al. | 715/513 |
| 2004/0119753 A1 | 6/2004 | Zencke | |
| 2006/0098085 A1 * | 5/2006 | Nichols et al. | 348/14.07 |

FOREIGN PATENT DOCUMENTS

| | | |
|---|---|---|
| JP | 04-090596 | 3/1992 |
| JP | H-04199693 A | 7/1992 |
| JP | 09-237080 | 9/1997 |
| JP | 63024419 | 2/1998 |
| JP | 2004-199696 | 7/2004 |
| JP | 2004233219 A | 8/2004 |
| JP | 2004272906 A | 9/2004 |

OTHER PUBLICATIONS

Overview and Detail, John Stasko, CF 7450—Information Visualization, Feb. 12, 2004, 48 pgs.

Picsel Browser, Piscel Technologies Ltd., Jul. 2002, 2 pgs.

Office Action for Russian Application No. 2007125492/08 dated Dec. 12, 2010 (13 pages).

Office Action from Singapore Patent Application No. 200906961-8, received Aug. 15, 2012.

Japanese Office Action for Application No. 2011-228906, dated Apr. 22, 2013.

* cited by examiner

SYSTEM AND METHOD FOR VIEWING DIGITAL VISUAL CONTENT ON A DEVICE

FIELD OF THE INVENTION

The present invention relates generally to the viewing and navigation of digital visual content. More particularly, the present invention relates to the viewing and navigation of digital visual content on devices having smaller displays than the digital visual content.

BACKGROUND OF THE INVENTION

Viewing web content on electronic devices can be difficult because, in many instances, only a portion of an entire page is shown at a given moment. This makes the task of locating specific information on the page difficult, even if the user knows roughly where specific information is located in the content. Due to the content being larger than the screen, the user is forced to scroll around the document, hoping to find the correct portion of the content. Additionally, the context of information visible on the screen at any given moment can also be unclear due to the surrounding areas in the document not being visible to the user.

Although attempts have been made to address the problems associated with large content visualization on displays of electronic devices, each of these attempts have their own drawbacks. One conventional system implements a "split screen" method which provides two views to the document. One such system is entitled Thunderhawk and manufactured by Bitstream, Inc. However, this approach has the drawback of reducing the screen size for both views. However, this system does not automatically provide a transparent overview of the document during the scrolling process.

An article by Stuart Pook, Eric Lecolinet, Guy Vaysseix and Emmanuel Barillot entitled "Context and Interaction in Zoomable User Interfaces" from Proceedings of the Working Conference on Advanced Visual Interfaces, p. 227, 231, May 2000 (Palermo, Italy) discloses the concept of providing a transparent overview of a document to the user. However, this system involves the use of such a transparent overview at all times, including when a user is staying in a single portion of the document and other times when such an overview is neither necessary nor desirable. This can make it more difficult for the user to view and work within the document.

On devices having larger screens, there are several conventional information visualization methods that provide both "focus and context": a miniature frame view of the context is displayed in one area, while the readable content is displayed on another area. This solution has the drawback of the miniature frame view reserving some of the screen space such that the user cannot fully utilize the display area for viewing readable content.

SUMMARY OF THE INVENTION

The present invention addresses the above-identified difficulties by providing a system that includes a transparent overview of a document, referred to herein as a minimap, when a user scrolls through the document.

The system and method of the present invention provides several significant advantages over conventional systems. In situations where the content to be viewed is larger than the available display, the present invention gives the user an overview of the document. In familiar content, a user can easily find the desired information. The present invention provides a system where the minimap is visible to the user while the user is in the process of scrolling through the content, which is desirable and not when the user is likely to be reading the actual content, which is undesirable. The present invention provides the user with more context than conventional systems, as the user sees his or her current position on the document and where he or she might navigate next. The minimap may also fill the entire display either as a result of a specific user action or by default. The transparency of the minimap improves the usability of the main view when the minimap is visible. Additionally, no screen space is wasted when user is not scrolling or panning inside content. In embodiments where the minimap is scrolled and updated only periodically, the processing power requirements for the implementation of the present invention are also lowered. Furthermore, the use of coloring effects on the minimap of the present invention aid the user in finding areas of the content that he or she has not yet viewed.

These and other objects, advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF THE PREFERRED EMBODIMENTS

Figure 1:
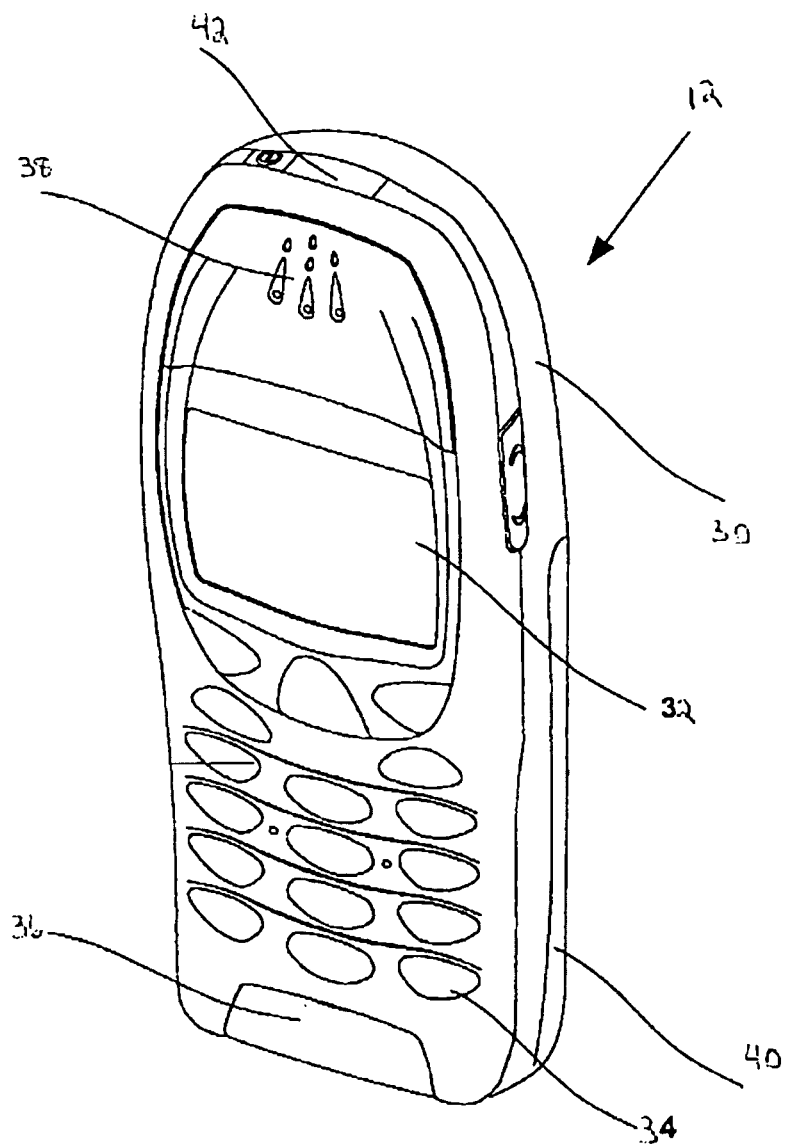
FIG. 1 is a perspective view of a mobile telephone that can be used in the implementation of the present invention.
Figure 2:
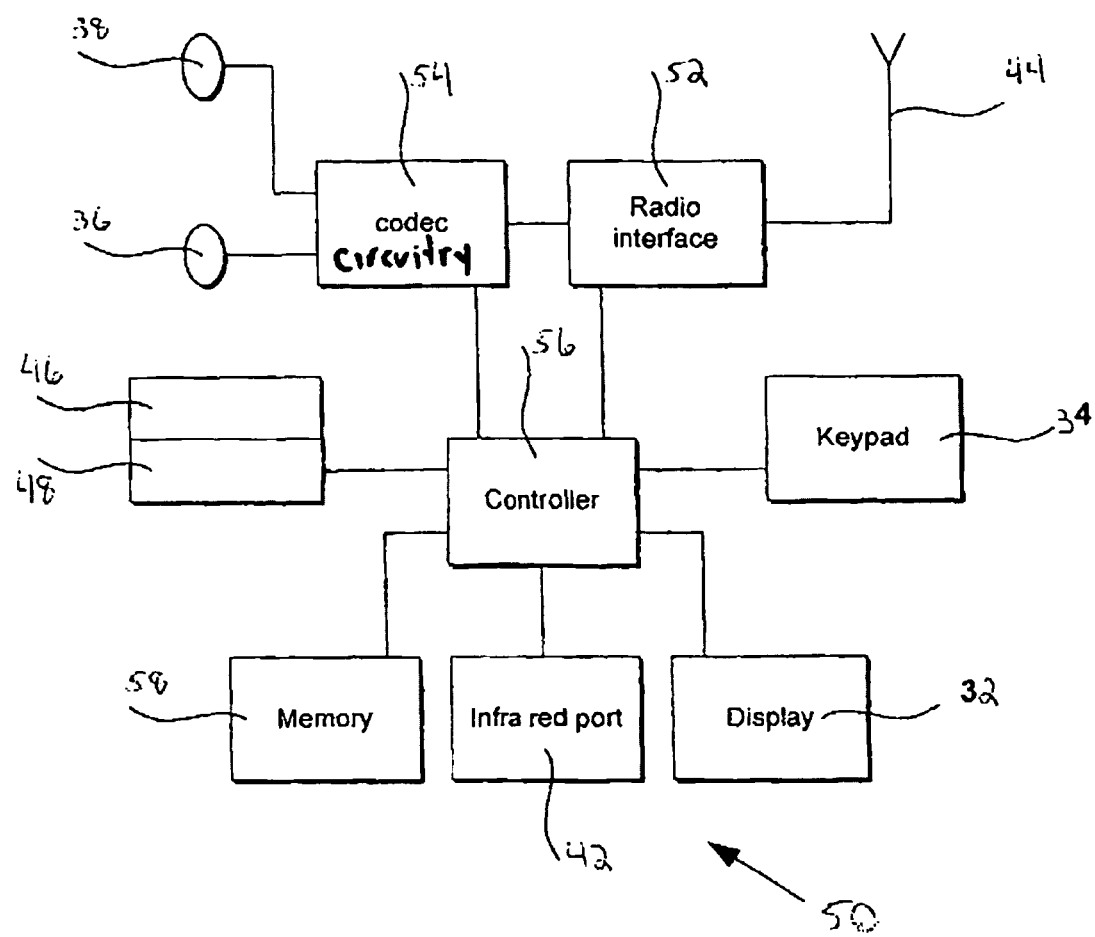
FIG. 2 is a schematic representation of the telephone circuitry of the mobile telephone of FIG. 1.

The present invention involves the addition of a transparent overview of content, referred to herein as a minimap, to be displayed in conjunction with the content itself. FIGS. 1 and 2 show one representative mobile telephone 12 upon which the present invention may be implemented. However, it is important to note that the present invention is not limited to any type of electronic device and could be incorporated into devices such as personal digital assistants, personal computers, mobile telephones, and other devices. It should be understood that the present invention could be incorporated on a wide variety of mobile telephones 12. The mobile telephone 12 of FIGS. 1 and 2 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment of the invention, a card reader 48, radio interface circuitry 52, codec circuitry 54, a controller 56 and a memory 58. Individual circuits and elements are all of a type well known in the art, for example in the Nokia range of mobile telephones.

Figure 3:
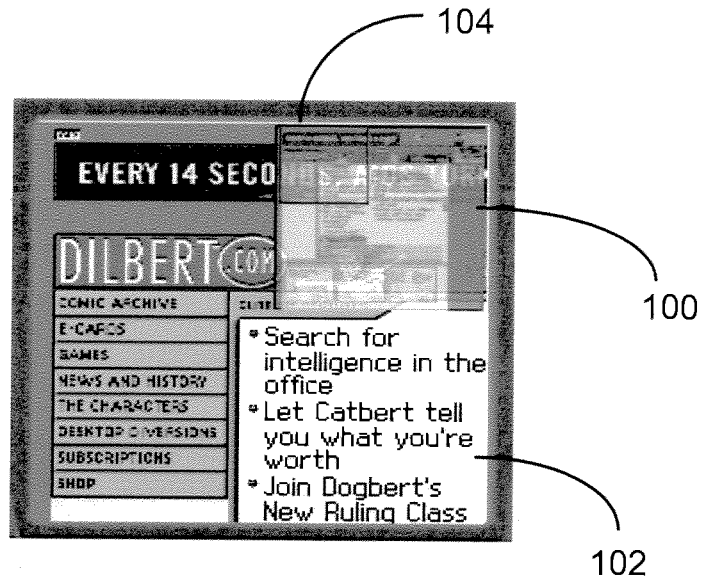
FIG. 3 is a screenshot of a web browser having a minimap visible during scrolling and/or panning process according to one embodiment of the present invention.
Figure 4:
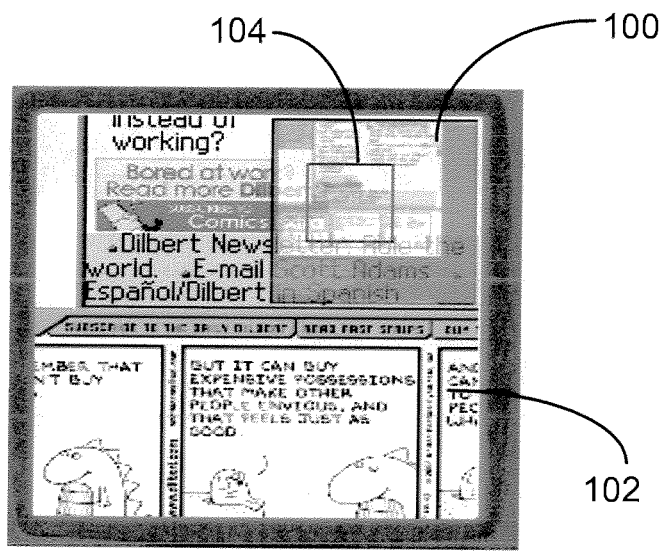
FIG. 4 is a screenshot of the same document in FIG. 3, wherein the screen is displaying a different portion for the content, the minimap has scrolled a designated amount and the indicator rectangle on minimap has moved.
Figure 5:
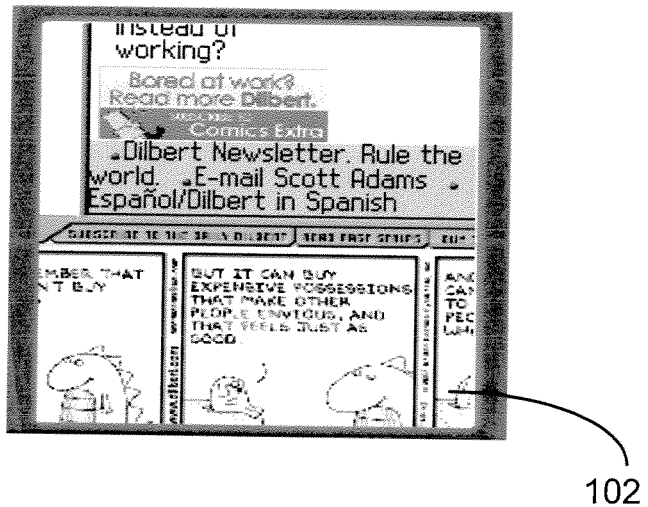
FIG. 5 is a screenshot displaying the same portion of the content as the screenshot of FIG. 4, wherein the minimap is no longer visible.

FIGS. 3-5 show a heavily downscaled version of a portion of the content, referred to as a minimap 100 or secondary image, is shown partially covering the display 32 along with a primary document view 102 or primary image. The primary document view 102 refers to that portion of the web content that is visible on the display 32 at any given moment. The present invention is discussed herein in relation to internet web pages. However, it should be understood that the present invention can be applied to virtually any type of document that is not capable of being displayed in its entirety on a display 32. The minimap 100 is drawn on top of the primary document view 102 and, according to one embodiment of the invention, is rendered partially transparent so that the primary document view's content below the minimap 100 shines through the minimap 100 when displayed. The scaled portion of the web content shown in the minimap 100 is selected so that it contains all of the content visible in the primary document view 102, plus significant amount of surrounding areas in the document that is not visible in the primary document view 102 at that given moment. In one embodiment of the invention, the entire web content is shown in the minimap 100.

In one embodiment of the invention, a framing rectangle 104 matching the portion of the web content visible in the primary document view 102 is shown as part of or on top of the minimap 100. The framing rectangle 104 is automatically moved accordingly when the user scrolls through the web content, changing the primary document view 102. The portion of document shown in the minimap 100 is also scrolled as needed so that the portion of the document visible in the primary document view, plus a sufficient amount of the surrounding content, stays visible in the minimap 100.

Graphical indicators may also be drawn on the minimap 100 to indicate directions in which the web content continues beyond the minimap view. Possible indicators include, but are not limited to, scrollbars and directional arrows. Alternatively, a rectangle can be depicted outside of the minimap 100 to indicate the document boundaries relative to the view in the minimap 100.

In one embodiment of the invention, the minimap 100 is visible only when the user is in the process of scrolling or panning through the document. As used herein, "panning" refers to the ability to "grab" a portion of the content, such as through the use of a mouse or stylus, and drag the content in a certain direction, causing the content to scroll in the direction of the drag. "Scrolling" refers to the actuation of directional buttons or indicators on the content, causing the content to move appropriately. Any type of scrolling or panning could be used in conjunction with the present invention. When the scrolling stops, the minimap 100 fades away from view or is removed after a time period. This can be either an automatic feature or a feature that is selectable and/or adjustable by the user. Alternatively, the minimap 100 appears or fades into view only when the system determines that the user is moving a long distance on the content. For example, if the user scrolls the page only a small amount (for example, to continue reading through a long text paragraph) the minimap 100 does not appear, instead only appearing with continuous scrolling by the user. The visibility of the minimap 100 may be further limited to continuous scrolling only, such as where a scrolling key or other item is held down, instead of a single or multiple clicks being used for small, incremental movement. In this type of situation, the minimap 100 is not shown when user scrolls down (or up) slowly for reading long texts, i.e. where the scrolling occurs only a few lines at a time. This feature is useful in that the minimap 100 could otherwise obstruct text reading, as space on the display 32 is not unnecessarily cluttered when the minimap feature is not needed.

Figure 6:
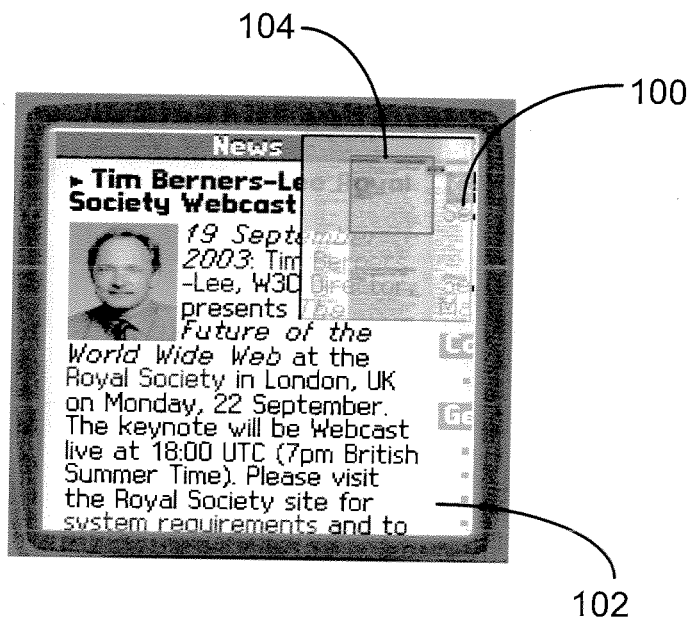
FIG. 6 is a screenshot of a web content demonstrating how a coloring effect can be used to show which portion of the document the user has already visited.

In one embodiment of the invention, a slight color tint may be applied to the minimap 100 for a newly formatted document. This coloring is shown in FIG. 6. In one embodiment of the invention, the coloring is removed, added or changed tone in the minimap 100 on those areas of the document that the user has already seen in the primary document view 102. The user can use this feature to determine which parts of the document he or she has already visited (for example, when trying to locate particular information for a large page).

As discussed above, the minimap 100 of the present invention is depicted in a partially transparent form. The minimap 100 is an additional view to the document. It has the same layout as the primary document view 102 and reflects changes to the document. It also has a different zoom level from the main view. In one embodiment of the invention, the minimap 100 is positioned on a predefined corner of the display 32. Alternatively, the position of the minimap 100 may change according to the scrolling direction. For example, if a user scrolls the view to right, the minimap 100 moves to the left side of the display 32. The minimap 100 may also fill the entire display 32 either as a result of a specific user action or by default. It should be noted that when the minimap 100 is referred to as being superimposed on the primary document view 102, it should be understood that a situation where the minimap 100 is beneath the primary document view 102 is also covered by this terminology. It is also possible that the primary document view 102 that is shown in transparent or translucent form.

With the present invention, when a display 32 having a document that is larger than the display 32, a user is provided with an overview of the entire content the document. If the user is viewing familiar content, the user is able to easily locate the information that is desired. The present invention also provides the user with additional context, as the user sees his or her current position on the document and where to navigate next.

In one embodiment of the present invention, the minimap 100 is scrolled and updated only periodically. This feature aids in saving power on the device and reducing the device's processing power requirements. For these same performance reasons, it is also possible for the minimap 100 to not immediately reflect changes to the document.

Figure 7:
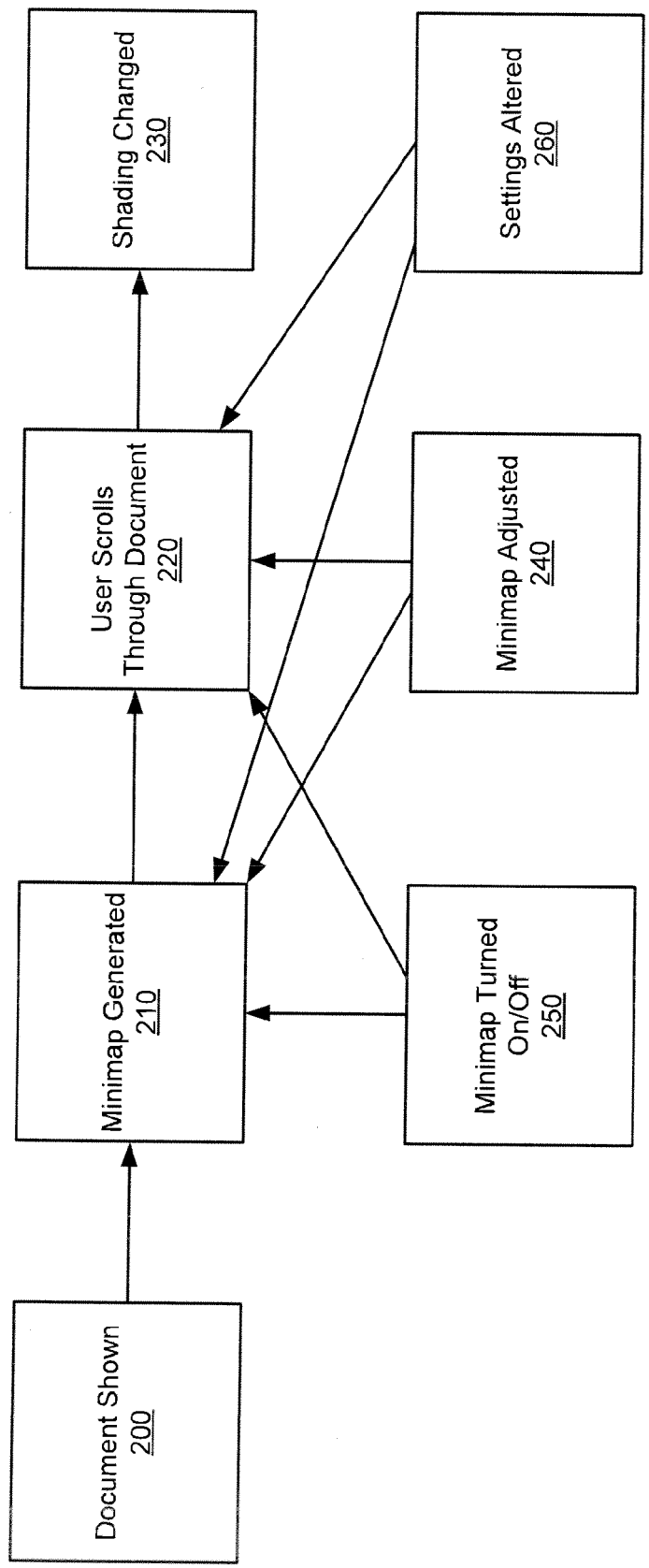
FIG. 7 is a flow chart showing the steps of operation according to one embodiment of the present invention.

FIG. 7 is a flow chart showing a generic operation of a system constructed according to one embodiment of the present invention. At step 200, a document is shown on the screen 32, with the primary document view 102 shown. At step 210, the minimap 100 is generated and superimposed on the primary document view 102. It is also possible for steps 200 and 210 to occur concurrently, or for step 210 to be displayed before the primary document view 102 appears. At step 220, the user scrolls through the document, causing the framing rectangle 104 to move to reflect the change of the primary document view 102. At step 230, the shading of various portions of the minimap 100 can change (either automatically or based upon settings set by the user) to reflect the portions of the document that were previously viewed by the user but no longer appear in the primary document view 102. At step 240, the minimap 100 can also be adjusted to change the portion of the document appearing in the minimap 100. Other potential options include the user turning on or off the minimap feature at step 250, as well as altering various settings (such as the position of the minimap 100, the colors used on the minimap 100 and the framing rectangle 104, etc.) at step 260.

While several embodiments have been shown and described herein, it should be understood that changes and modifications can be made to the invention without departing from the invention in its broader aspects. For example, but without limitation, the present invention could be incorporated into a wide variety of electronic devices, such as cellular telephones, personal digital assistants, and other devices. The invention could also be used on much larger screens, including wall projections, where the image to be displayed is larger than the screen. The present invention can also be used on many types of documents besides web pages, such as text documents, spreadsheet documents, graphics documents, videos, animations, graphs, vector graphics, wireless application protocol (WAP) pages, and other materials. It is also possible that the present invention could be used with three-dimensional content as well. The minimap 100, progress indicators, and other features could also be incorporated into multiple layers above and below the primary document view 102, permitting multiple transparent or translucent layers. Furthermore LCD displays can be used on top of each other, creating multiple transparent physical layers instead virtual layers. Various features of the invention are defined in the following claims.

What is claimed is:

1. A method comprising:
   causing display of a zoomed-in portion of a document on a display as a primary image, wherein at least an additional portion of the document is not represented by the primary image at a given moment;
   generating a secondary image, the secondary image including the zoomed-in portion and at least the additional portion of the document, wherein the secondary image: a) is a zoomed-out view of the document, b) indicates a location of the primary image with respect to the document, and c) is smaller than the primary image;
   causing simultaneous display of the secondary image and the primary image on the display such that both the secondary image and the primary image are visible to a user and the secondary image covers only part of the primary image;
   in response to a scrolling of the primary image, causing a position of the secondary image to change relative to the primary image based on a direction of the scrolling such that at least a segment of the primary image previously covered by the secondary image is uncovered, wherein the at least one segment is identified based on the scrolling direction;
   altering the primary image such that at least a part of the additional portion, previously not represented by the primary image, is visible to the user on the primary image; and
   automatically adjusting the secondary image to indicate the location of the primary image with respect to the document based on the altered primary image.

2. The method of claim 1, wherein the secondary image is transparent such that material in the primary image positioned underneath the secondary image is at least partially visible to the user.

3. The method of claim 1, further comprising:
   altering the primary image such that at least a part of the additional portion, previously not represented by the primary image, is visible to the user on the primary image; and
   automatically adjusting the secondary image to indicate the location of the primary image with respect to the document based on the altered primary image.

4. The method of claim 3, further comprising automatically indicating in the secondary image, the location of at least a part of the document that was previously but is no longer represented by the altered primary image.

5. The method of claim 1, further comprising removing the secondary image from view following a removal of the scrolling.

6. The method of claim 5, wherein removing the secondary image from view comprises causing the secondary image to fade away from view following removal of the scrolling.

7. The method of claim 1, further comprising:
   causing shading of viewed areas on the secondary image, wherein the viewed areas have been previously viewed in the primary image.

8. The method of claim 1, further comprising:
   causing framing of an area on the secondary image, wherein the framed area is currently represented in the primary image.

9. The method of claim 1, further comprising:
   receiving an indication, provided by the user, of a desired position of the secondary image on the display; and
   causing a position of the secondary image to change based on the indication.

10. The method of claim 1, wherein the secondary image is generated in response to a user input.

11. The method of claim 1, wherein causing the position of the secondary image to change comprises moving the secondary image in the opposite direction of the scrolling direction.

12. An electronic device, comprising:
    a memory unit; and
    a processor operatively connected to the memory unit,
    wherein the memory unit includes computer program code configured to, with the processor, cause the electronic device to:
       causing display of a zoomed-in portion of a document on a display as a primary image, wherein at least an additional portion of the document is not represented by the primary image at a given moment;
       generate a secondary image, the secondary image including the zoomed-in portion and at least the additional portion of the document, wherein the secondary image: a) is a zoomed-out view of the document, b) indicates a location of the primary image with respect to the document, and c) is smaller than the primary image;
       cause simultaneous display of the secondary image and the primary image on the display such that both the secondary image and the primary image are visible to a user and the secondary image covers only part of the primary image;
       in response to a scrolling of the primary image, cause a position of the secondary image to change relative to the primary image based on a direction of the scrolling such that at least a segment of the primary image previously covered by the secondary image is uncovered, wherein the at least one segment is identified based on the scrolling direction;
       alter the primary image such that at least a part of the additional portion, previously not represented by the primary image, is visible to the user on the primary image; and automatically adjust the secondary image to indicate the location of the primary image with respect to the document based on the altered primary image.

13. The electronic device of claim 12, wherein the secondary image is transparent such that material in the primary image, positioned beneath the secondary image, is at least partially visible to the user.

14. The electronic device of claim 12, wherein the secondary image is not transparent.

15. The electronic device of claim 12, wherein the computer program code is further configured to cause the electronic device to:
   alter the primary image such that at least a part of the additional portion, previously not part of the primary image, is visible to the user on the primary image; and
   automatically adjust the secondary image to indicate the location of the primary image with respect to the document based on the altered primary image.

16. The electronic device of claim 15, wherein the computer program code is further configured to cause the electronic device to automatically indicate in the secondary image, the location of at least a part of the document that was previously, but is no longer, represented by the altered primary image.

17. The electronic device of claim 12, wherein the secondary image includes the entire document.

18. The electronic device of claim 12, wherein the computer program code is further configured to cause the electronic device to remove the secondary image from view following removal of the scrolling.

19. The electronic device of claim 18, wherein removing the secondary image from view comprises causing the secondary image to fade away from view following the removal of the scrolling.

20. An apparatus comprising
   at least one processor and at least one memory including computer program code, the at least one memory and the computer program code configured to, with the processor, cause the apparatus to perform at least:
   causing display of a zoomed-in portion of a document on a display as a primary image, wherein at least an additional portion of the document is not represented by the primary image at a given moment;
   generating a secondary image, the secondary image including the zoomed-in portion and at least an additional portion of the document, wherein the secondary image: a) is a zoomed-out view of the document, b) indicates a location of the primary image with respect to the document, and c) is smaller than the primary image;
   simultaneously displaying the secondary image and the primary image on the display such that both the secondary image and the primary image are visible to a user and the secondary image covers only part of the primary image;
   in response to a scrolling of the primary image, causing a position of the secondary image to change relative to the primary image based on a direction of the scrolling such that at least a segment of the primary image previously covered by the secondary image is uncovered, wherein the at least one segment is identified based on the scrolling direction;
   altering the primary image such that at least a part of the additional portion, previously not represented by the primary image, is visible to the user on the primary image; and automatically adjusting the secondary image to indicate the location of the primary image with respect to the document based on the altered primary image.

21. The apparatus of claim 20, wherein the secondary image is transparent such that material in the primary image, positioned beneath the secondary image, is at least partially visible to the user.

22. The apparatus of claim 20, wherein the secondary image is not transparent.

23. The apparatus of claim 20, wherein the at least one memory and the computer program code are further configured to, with the processor, cause the apparatus to perform at least:
   altering the primary image such that at least a part of the additional portion, previously not part of the primary image, is visible to the user on the primary image; and
   automatically adjusting the secondary image to indicate the location of the primary image with respect to the document based on the altered primary image.

24. The apparatus of claim 23, wherein the at least one memory and the computer program code are configured to, with the processor, cause the apparatus to perform at least:
   automatically indicating in the secondary image, the location of at least a part of the document that was previously but is no longer represented by the altered primary image.

25. The apparatus of claim 20, wherein the secondary image includes the entire document.

26. The apparatus of claim 20, wherein the at least one memory and the computer program code are further configured to, with the processor, cause the apparatus to perform at least:
   removing the secondary image from view following a removal of the scrolling.

27. The apparatus of claim 26, wherein
   removing the secondary image from view comprises causing the secondary image to fade away from view following the scrolling.

28. A computer program product comprising at least one non-transitory computer-readable storage medium having computer-executable program code instructions stored therein, the computer-executable program code instructions comprising program code instructions for:
   causing display of a zoomed-in portion of a document as a primary image on a display, wherein at least an additional portion of the document is not represented by the primary image at a given moment;
   generating a secondary image, the secondary image including the zoomed-in portion and at least the additional portion of the document not represented by the primary image, wherein the secondary image: a) is a zoomed-out view of the document, b) indicates a location of the primary image with respect to the document, and c) is smaller than the primary image;
   causing simultaneous display of the secondary image and the primary image on the display such that both the secondary image and the primary image are visible to a user and the secondary image covers only part of the primary image;
   in response to a scrolling of the primary image, causing a position of the secondary image to change relative to the primary image based on a direction of the scrolling such that at least a segment of the primary image previously covered by the secondary image is uncovered, wherein the at least one segment is identified based on the scrolling direction;

altering the primary image such that at least a part of the additional portion, previously not represented by the primary image, is visible to the user on the primary image; and automatically adjusting the secondary image to indicate the location of the primary image with respect to the document based on the altered primary image.

29. The computer program product of claim 28, wherein the secondary image is transparent such that material in the primary image positioned underneath the secondary image is at least partially visible to the user.

30. The computer program product of claim 28, wherein the secondary image is not transparent.

31. The computer program product of claim 28, wherein the computer-executable program code instructions further comprise program code instructions for:

altering the primary image such that at least a part of the additional portion, previously not represented by the primary image, is visible to the user on the primary image; and automatically adjusting the secondary image to indicate the location of the primary image with respect to the document based on the altered primary image.

32. The computer program product of claim 31, wherein the computer-executable program code instructions further comprise program code instructions:

for automatically indicating in the secondary image, the location of at least a part of the document that was previously, but is no longer represented by the altered primary image.

33. The computer program product of claim 28, wherein the secondary image includes the entire document.

34. The computer program product of claim 28, wherein the computer-executable program code instructions further comprise program code instructions for: removing the secondary image from view following removal of the scrolling.

35. The computer program product of claim 34, wherein removing the secondary image from view comprises causing the secondary image to fade away from view following the removal of the scrolling.

\* \* \* \* \*